Figure 1:
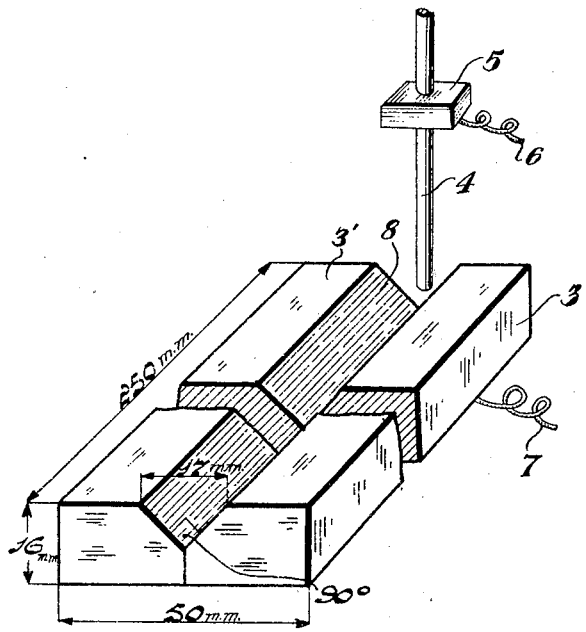

July 12, 1949.　　　　T. HEHENKAMP　　　　2,475,835

METHOD OF ELECTRIC ARC WELDING

Filed Sept. 5, 1945

INVENTOR
THEODORUS HEHENKAMP
BY
ATTORNEY

Patented July 12, 1949

2,475,835

UNITED STATES PATENT OFFICE 2,475,835

METHOD OF ELECTRIC ARC WELDING

Theodorus Hehenkamp, Eindhoven, Netherlands, assignor to Hartford National Bank & Trust Co., Hartford, Conn., as trustee Application September 5, 1945, Serial No. 614,590
In the Netherlands September 3, 1943

Section 1, Public Law 690, August 8, 1946
Patent expires September 3, 1963

4 Claims. (Cl. 219—10)

A method of automatic arc welding is known wherein the end of a current-carrying bare welding wire is continuously kept in a layer of pulverulent or granular slag-forming material which is provided on the work-piece to be welded. This method offers the possibility of utilizing high welding currents so that it is possible to attain a high speed of welding by which expression is meant the number of grams of welding metal deposited in one second. In this method the conditions have to be so chosen that development of too much heat due to the Joule-effect does not occur. That is, the excessively high temperatures which are produced in that portion of the welding wire which is located between the running-down point and the point of current supply is not permitted because this is not desirable.

The invention is based on the recognition that the welding process can be influenced in a predetermined manner if we deviate fundamentally from the point of view given above. That is to say, we may actually take advantage of the occurrence of the said comparatively high temperatures.

According to the invention, the heat due to the Joule-effect which is required for this purpose is produced in the said welding wire portion, which may be effected by increasing the distance between the point of running-down and the point of current supply or by utilizing a greater current density. The consequence of the thus obtained preheating of the welding wire is that for depositing a given quantity of welding metal less energy has to be supplied by the arc, which offers various possibilities for influencing the welding process.

Thus, for example, with a constant welding speed it is possible to obtain a less deep penetration, i. e. that a smaller quantity of metal of the work piece is melted, by increasing the distance between the running-down point and the point of current supply and by reducing at the same time the current intensity if the other factors which command the welding process remain unchanged. It is furthermore possible to increase the speed of welding by increasing the distance between the running-down point and the point of current supply if the other factors, also the current intensity, remain unchanged. When the seam filling is kept constant, the penetration is slightly reduced. Furthermore, due to the use of a greater current density the penetration and the speed of welding are increased by the thus increased arc energy if the point of current supply and the other factors remain unchanged. However, in this case the speed of welding is further increased by the additionally produced Joule-heat so that the speed of welding becomes higher than would be expected solely on account of the current intensity.

It is also possible to vary the distance between the running-down point and the point of current supply and the current density independently of one another in such a manner that we obtain a penetration and a speed of welding which are desired in a predetermined case.

The additional production of heat due to the Joule-effect, according to the invention, causes in these cases an increase of the temperature in the welding wire portion between the running-down point and the point of current supply. As a matter of fact, in such case it is only the temperature near the running-down point that is of importance for the effect of the invention. With a welding wire substantially consisting of iron, a few mms. from the running-down point this temperature may exceed 600° C. as can be calculated approximately.

In the table below the invention will be illustrated with reference to a few examples.

| | L | I | T | V | $V_0$ | $V/V_0$ | B |
|---|---|---|---|---|---|---|---|
| 1 | 6 | 600 | 470 | 1.9 | 1.70 | 1.12 | 0.75 |
| 2 | 18 | 440 | 980 | 1.8 | 1.24 | 1.45 | 0.30 |
| 3 | 13 | 600 | 980 | 2.6 | 1.70 | 1.53 | 0.65 |
| 4 | 6 | 730 | 660 | 2.6 | 2.05 | 1.27 | 0.80 |
| 5 | 10 | 730 | 980 | 3.0 | 2.05 | 1.46 | 0.75 |

In the examples indicated in the table a V-shaped seam in a work piece of ordinary soft iron (see Fig. 1) was completely filled in a single welding operation with the use of a welding wire of the same material which had a diameter of 4 mms. The dimensions of the work-piece were 250 by 50 by 16 mms. The preparation was such that the V-shaped seam located in the direction of the length of the workpiece had an opening angle of 90° whilst, measured in the upper surface of the work piece (see Fig. 2), the seam had a width of 17 mms. (see Fig. 1). During the welding operation the end of the continuously fed welding wire was kept immersed in a layer of slag-forming material provided on the seam (see Fig. 3). This slag-forming material consisted of a granular mass substantially consisting of approximately 25% quartz, 15% dolomite, 25% magnetite, 20% ferro-manganese and 10% water glass. During the welding operation the arc voltage amounted to about 35 volts.

In the first column of the table is mentioned in cms. the distance L between the point of current supply and the running-down point of the welding wire. In the second column is mentioned the utilized welding current intensity, I in amperes. The third column shows the calculated increase of the temperature T in C° a few mms. before the running-down point in consequence of the heat due to the Joule-effect which is produced in the wire by the welding current. Subsequently, the fourth column mentions in grams of welding metal deposited in each second the welding speed V attained in these conditions. In the fifth column is furthermore mentioned the value $V_0$, which is referred to hereinafter as the "specific welding speed" and which represents the welding speed which would occur in the theoretical case wherein no Joule heat is produced at all in the welding wire. This value is determined by extrapolation from the values of the welding speed measured in different cases wherein decreasing quantities of Joule heat were developed, which values may be obtained in a simple manner by displacing the current-supply contact in the direction of the running-down point, the other factors which command the welding process being left unchanged. Furthermore, the sixth column indicates the ratio $V/V_0$. Finally, the seventh column indicates the penetration B. The numbers given in this column for the penetration are obtained by dividing the surface area 1 of the molten portion of the work-piece, considered in the cross-section of the weld, by the surface area 2 of the cross-section of the seam to be filled (see Fig. 2).

The table thus shows the influence exerted upon the speed of welding and upon the penetration when the temperature of the welding wire near the running-down point is increased and the welding current is varied.

Although the invention has been described hereinbefore for automatic welding operations wherein the end of a bare current-carrying welding wire is continuously immersed in a slag-forming material, it may also be applied to other methods of automatic welding wherein the welding wire carries current.

Since the basic idea of the invention has been described hereinbefore, there may now be given a formal delimitation of the invention by referring to that which is known, and to the specific speed of welding mentioned in the table and above described more fully.

The scope of the invention may now be delimited by the condition that so much heat has to be developed due to the Joule-effect that in consequence thereof the speed of welding is higher than 1.2, preferably 1.3 times the specific welding speed.

On the ground of the above-described recognition that the adjustment of the temperature near the running-down point of the welding wire permits attaining predetermined results, the invention furthermore includes such adjustment even when effected otherwise than by influencing the Joule-energy. Although less applied in practice, this may be effected either by causing the welding wire to take up heat from a separate source of heat or by cooling the welding wire. In the latter case it is possible to obtain an effect which is opposite to that which may be obtained by supplying heat.

Since the adjustment of the temperature near the running-down point may be effected otherwise than by influencing the heat due to the Joule-effect, the invention may also be applied in principle to methods of automatic electric arc welding wherein the welding wire to be fed continuously does not carry current itself and the arc is struck between the workpiece and, for example, a carbon electrode.

The invention includes furthermore a device suitable for automatic electric arc welding and characterized in that it comprises means for the regulable adjustment of the temperature near the running-down point of the welding wire. In the described highly important embodiment of the invention wherein this adjustment is effected by means of the Joule-heat developed in the welding-wire, use may be made for this purpose in a simple manner of a displaceable, preferably slidable, current-supply contact.

Having described the invention hereinbefore, for the purpose of illustrating a specific structural embodiment by which the mode of the invention may be applied, reference will now be made to the drawings wherein Figure 1 is a perspective view of a pair of work-pieces in abutting relationship with a welding wire and current connection therefor arranged according to the invention in the welding seam of the work-pieces prior to addition of the slag-forming material in the seam.

Figure 2:
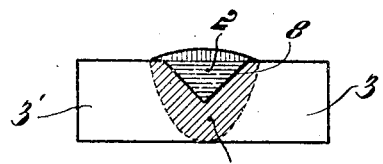

Figure 2 is a cross-sectional view of the welded work-pieces of Figure 1 after a welding operation according to the invention.

As illustrated in Figure 1, a pair of abutting work-pieces 3, 3', having overall dimensions such as indicated, and a seam of a top width and bottom angle as likewise indicated, has attached thereto one wire 7 of a welding circuit. Positioned in the seam 8, is a welding wire 4 which has positioned thereon a sliding contact 5 to which is attached the other wire 6 of the welding circuit. Prior to the welding operation, a slag-forming material is placed in the seam 8 through which the welding wire 4 is moved laterally as current is passed through the assembly via wires 6 and 7. Heating of the welding wire 4 is adjustably accomplished as desired for particular conditions encountered by moving the sliding contact 5 up or down the length of welding wire as the case may be.

Figure 2 shows the work-pieces 3 and 3' joined together after a welding operation according to the invention. The numeral 1 refers to the cross-sectional area of the work-pieces 3 and 3' which has melted during the said operation while numeral 2 designates the cross-section of the weld material which fills seam 8.

It is to be understood that the particular form of apparatus shown and described, and the particular procedure set forth, are presented for purposes of explanation and illustration and that various modifications of the apparatus and procedure can be made without departing from the invention as defined in the appended claims.

What I claim is:

1. A method of automatic electric arc welding which comprises the steps of placing a layer of slag-forming material on the metal work-piece to be welded, keeping the running-down point of the metal welding wire in the said material and automatically varying, in response to the temperature of the metal welding wire at a point near the running-down point thereof, the distance between the running-down point and the point of current supply to the wire to maintain the Joule effect of the welding current in the wire to a value at which the speed of welding is at least 1.2 times greater than the specific welding speed as the intensity of the welding current remains unchanged.

2. A method of automatic electric arc welding which comprises the steps of placing a layer of pulverulent slag-forming material on the metal work-piece to be welded, maintaining the running-down point of the metal welding wire in the said material and varying the length of the welding wire between the running-down point and the point of current supply of the welding current independently of each other so as to keep the Joule effect of the welding current in the wire to a value at which the welding speed is between 1.2 and 1.3 times faster than the specific welding speed.

3. A method of increasing the speed of electric arc welding which comprises the steps of placing a layer of granular slag-forming material consisting of a granular mass of approximately 25% quartz, approximately 15% dolomite, approximately 25% magnetite, approximately 20% ferro-manganese and approximately 10% water glass on the metal work-piece to be welded, keeping the running-down point of the metal welding wire in the said material and so adjusting the distance between the said running-down point and the point of current supply as to obtain a required Joule effect of the welding current in the said wire at which the speed of welding is at least 1.2 times the specific welding speed.

4. A method of automatic electric arc welding which comprises the steps of placing a metal welding wire in welding relationship to a metal work-piece to be welded, keeping the running-down point of the welding wire in welding position relative to the said metal work-piece, feeding current to the welding wire at a location along the length thereof, and varying the temperature of the welding wire to a value at which the desired welding speed and penetration is obtained by adjusting the location along the length of the welding wire to which the current is fed.

THEODORUS HEHENKAMP.

REFERENCES CITED

The following references are of record in the file of this patent:

UNITED STATES PATENTS

| Number | Name | Date |
|---|---|---|
| 2,043,960 | Jones et al. | June 9, 1936 |
| 2,277,654 | Merlub-Sobel et al. | Mar. 24, 1942 |
| 2,405,673 | Scherl | Aug. 13, 1946 |
| 2,423,515 | Morris | July 8, 1947 |